(12) United States Patent
Lee et al.

(10) Patent No.: US 10,668,924 B2
(45) Date of Patent: Jun. 2, 2020

(54) METHOD AND APPARATUS TO CONTROL VELOCITY OF VEHICLE

(71) Applicant: Samsung Electronics Co., Ltd., Suwon-si (KR)

(72) Inventors: Jaewoo Lee, Hwaseong-si (KR); Dongwook Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 15/799,119

(22) Filed: Oct. 31, 2017

(65) Prior Publication Data

US 2018/0148053 A1    May 31, 2018

(30) Foreign Application Priority Data

Nov. 29, 2016  (KR) .................. 10-2016-0160673

(51) Int. Cl.
*B60W 30/14* (2006.01)
*G06K 9/00* (2006.01)
(Continued)

(52) U.S. Cl.
CPC ........ *B60W 30/146* (2013.01); *B60W 30/143* (2013.01); *B60W 40/105* (2013.01); *G05D 1/0251* (2013.01); *G06K 9/00791* (2013.01); *G06K 9/00798* (2013.01); *G06K 9/209* (2013.01); *G06K 9/34* (2013.01);
(Continued)

(58) Field of Classification Search
CPC ............. B60W 30/146; B60W 30/143; B60W 40/105; B60W 2420/42; B60W 2420/52; B60W 2540/04; B60W 2550/12; B60W 2550/14; B60W 2720/10; G05D 1/0251; G06K 9/00791; G06K 9/00798; G06K 9/209; G06K 9/34; G06K 9/4604; G06K 9/6256; G06K 9/00805; G06T 7/20;
(Continued)

(56) References Cited

U.S. PATENT DOCUMENTS 8,583,329 B2    11/2013  Breed
2011/0066312 A1*   3/2011  Sung .................... G05D 1/0223
                                         701/25
(Continued)

FOREIGN PATENT DOCUMENTS

EP    1 422 663 B1    4/2014
KR   10-0963849 B1    6/2010
(Continued)

OTHER PUBLICATIONS

Negru et al., Mihai Negru, et al., "Assisting Navigation in Homogenous Fog,", Proceedings of the International Conference on Computer Vision Theory and Applications (VISAPP), vol. 2, Lisbon, Portugal, Jan. 2014.*
(Continued)

*Primary Examiner* — Paula L Schneider
(74) *Attorney, Agent, or Firm* — Sughrue Mion, PLLC

(57) ABSTRACT

A method to control a velocity of a vehicle includes: extracting an end point of a road region from an input image; measuring a visibility distance between an end point location corresponding to the end point and a location of a vehicle; and controlling the velocity of the vehicle based on the measured visibility distance.

20 Claims, 22 Drawing Sheets

(51) Int. Cl.
*G06K 9/34* (2006.01)
*B60W 40/105* (2012.01)
*G05D 1/02* (2020.01)
*G06K 9/20* (2006.01)
*G06K 9/46* (2006.01)
*G06K 9/62* (2006.01)
*G06T 7/20* (2017.01)
*G06T 7/60* (2017.01)
*G06T 7/11* (2017.01)

(52) U.S. Cl.
CPC ......... *G06K 9/4604* (2013.01); *G06K 9/6256* (2013.01); *G06T 7/20* (2013.01); *G06T 7/60* (2013.01); *B60W 2420/42* (2013.01); *B60W 2420/52* (2013.01); *B60W 2540/04* (2013.01); *B60W 2550/12* (2013.01); *B60W 2550/14* (2013.01); *B60W 2720/10* (2013.01); *G06K 9/00805* (2013.01); *G06T 7/11* (2017.01); *G06T 2207/10028* (2013.01); *G06T 2207/30256* (2013.01); *G06T 2207/30261* (2013.01)

(58) Field of Classification Search
CPC ... G06T 7/60; G06T 7/11; G06T 2207/10028; G06T 2207/30256; G06T 2207/30261
USPC .......................................................... 701/93
See application file for complete search history.

(56) References Cited

U.S. PATENT DOCUMENTS

| | | | | |
|---|---|---|---|---|
| 2013/0013164 | A1* | 1/2013 | Taguchi | B60W 30/143 701/96 |
| 2015/0191118 | A1 | 7/2015 | Matsukawa et al. | |
| 2016/0110623 | A1* | 4/2016 | Kim | G06K 9/3233 382/103 |
| 2017/0015320 | A1* | 1/2017 | Knoller | B60W 50/14 |
| 2017/0158205 | A1* | 6/2017 | Pink | B60W 30/08 |

FOREIGN PATENT DOCUMENTS

| | | |
|---|---|---|
| KR | 10-1240181 B1 | 3/2013 |
| KR | 10-1303528 B1 | 9/2013 |
| KR | 10-2016-0022633 A | 3/2016 |
| KR | 10-2016-0056561 A | 5/2016 |
| KR | 10-2016-0066854 A | 6/2016 |
| KR | 10-1628503 B1 | 6/2016 |
| KR | 10-2016-0078865 A | 7/2016 |

OTHER PUBLICATIONS

Zbontar et al., Jure Zbontar et al., "Stereo Matching by Training a Convolutional Neural Network to Compare Image Patches," *Journal of Machine Learning Research*, Oct. 2015, pp. 1-32.*

Atis Zarins, et al., "Sight Distance detection using LIDAR and GPS data," *Journal of Forestry Research*, vol. 25, Jun. 2010 (8 pages, in English).

Jean-Philippe Tarel, et al., "3D Road Environment Modeling Applied to Visibility Mapping: an Experimental Comparison," *Proceedings of the 16th International Symposium on Distributed Simulation and Real Time Applications*, Oct. 2012, pp. 19-26.

Jure Zbontar et al., "Stereo Matching by Training a Convolutional Neural Network to Compare Image Ratches," *Journal of Machine Learning Research*, Oct. 2015, pp. 1-32.

Wenjie Luo et al., "Efficient Deep Learning for Stereo Matching," *Proceedings of the IEEE Conference on Computer Vision and Pattern Recognition*, Jun. 2016, pp. 5695-5703.

Extended European Search Report dated Aug. 8, 2018, in corresponding European Application No. 17194442.4 (16 pages, in English).

D. Gruyer et al., "Distributed Simulation Architecture for the Design of Cooperative ADAS," *Proceedings of the First International Symposium on Future Active Safety Technology toward zero-traffic-accident*, Tokyo, Japan, Sep. 2011, pp. 1-8.

Mihai Negru, et al., "Assisting Navigation in Homogenous Fog," *Proceedings of the International Conference on Computer Vision Theory and Applications (VISAPP)*, vol. 2, Lisbon, Portugal, Jan. 2014 (8 pages, in English).

Partial European Search Report dated Apr. 24, 2018, in corresponding European Application No. 17194442.4 (12 pages, in English).

* cited by examiner

METHOD AND APPARATUS TO CONTROL VELOCITY OF VEHICLE

CROSS-REFERENCE TO RELATED APPLICATIONS

This application claims the benefit under 35 USC § 119(a) of Korean Patent Application No. 10-2016-0160673 filed on Nov. 29, 2016, in the Korean Intellectual Property Office, the entire disclosure of which is incorporated herein by reference for all purposes.

BACKGROUND

1. Field

The following description relates to technology that controls a velocity of a vehicle.

2. Description of Related Art

Automatic driving includes automatic performance of a variety of operations required while driving a vehicle. For example, a host vehicle that performs automatic driving travels on a road for itself without a driver controlling a steering wheel, an accelerator, and a brake. Various technologies for automatic driving are performed through vicinity image information obtained from a vehicle. In particular, although a lane for automatic driving is detected from an image of a front view captured from the vehicle, a restricted range of information is collected by the vehicle due to a terrain in a vicinity of the vehicle, bad weather such as snow, rain, and fog, and a road shape.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to control a velocity of a vehicle includes: extracting an end point of a road region from an input image; measuring a visibility distance between an end point location corresponding to the end point and a location of the vehicle; and controlling the velocity of the vehicle based on the measured visibility distance.

The extracting of the end point of the road region may include identifying lane lines from the input image, extracting a driving lane region from the road region based on the lane lines, and extracting, as the end point of the road region, an end point of the extracted driving lane region.

The extracting of the end point of the road region may include identifying the road region from the input image, and extracting, as the end point, a pixel at a farthest distance from a side of the vehicle in the input image, among pixels included in the road region.

The extracting of the end point of the road region may include identifying the road region and a center line on the road region from the input image, and extracting, as the end point, a pixel at a farthest distance from a side of the vehicle in the input image, among pixels included in the center line.

The method may further include: acquiring a first image included in the input image using a first camera; and acquiring a second image included in the input image using a second camera spaced apart from the first camera, wherein the measuring of the visibility distance includes determining a pixel disparity corresponding to an end point of either one of the first image and the second image, and measuring the visibility distance based on the pixel disparity.

The determining of the pixel disparity may include extracting a pixel disparity map from the first image and the second image using a pixel disparity model that is trained to output a training display map from a training image, and selecting a pixel disparity corresponding to the end point of the one of the first image and the second image in the pixel disparity map.

The measuring of the visibility distance based on the pixel disparity may include measuring the visibility distance further based on a baseline distance between the first camera and the second camera, and a focal length of the first camera and the second camera.

The determining of the pixel disparity may include determining end points from the first image and determining end points from the second image, calculating disparities between the end points of the first image and the end points of the second image, respectively, and determining a disparity statistical value of the calculated disparities to be the pixel disparity.

The extracting of the end point of the road region may include determining an end point of the first image from a road region of the first image, estimating a pixel corresponding to the end point of the first image from the second image, and determining the estimated pixel as an end point of the second image.

The measuring of the visibility distance may include generating a vicinity distance map with respect to a vicinity of the vehicle using a light imaging, detection, and ranging (LiDAR) sensor, calibrating the vicinity distance map to the input image, and selecting a distance corresponding to the end point of the input image as the visibility distance, from the vicinity distance map.

The controlling of the velocity of the vehicle may include determining a stopping distance for the vehicle based on the visibility distance, calculating a maximum velocity of the vehicle based on the stopping distance, and adjusting the velocity of the vehicle to be less than or equal to the maximum velocity.

The calculating of the maximum velocity of the vehicle may include calculating the maximum velocity of the vehicle further based on a length of the vehicle.

The method may further include adjusting either one or both of the determined stopping distance and the calculated maximum velocity in response to reception of a user input.

The calculating of the maximum velocity of the vehicle may include obtaining maximum velocity information corresponding to the location of the vehicle based on the location of the vehicle, and calculating the maximum velocity of the vehicle further based on the maximum velocity information.

The adjusting of the velocity of the vehicle may include adjusting the velocity of the vehicle to be the maximum velocity in response to no object being detected on the road region.

The method may further include determining a statistical value of distances between respective end point locations corresponding to end points and the location of the vehicle to be the visibility distance, in response to the end points being extracted.

The controlling of the velocity of the vehicle may include determining an obtainable stopping distance based on the visibility distance and a line shape of a driving road of the vehicle, and calculating a maximum velocity of the vehicle based on the stopping distance.

The controlling of the velocity of the vehicle may include excluding a reaction distance with respect to the vehicle, and determining a maximum velocity of the vehicle based on a braking distance.

A non-transitory computer-readable storage medium may store instructions that, when executed by a processor, cause the processor to perform the method.

In another general aspect, an apparatus to control a velocity of a vehicle includes: a sensor configured to acquire an input image; and a processor configured to extract an end point of a road region from the input image, to determine a visibility distance between an end point location corresponding to the end point and a location of the vehicle, and to control the velocity of the vehicle based on the determined visibility distance.

The processor may be configured to extract the end point of the road region by determining a driving lane region from the road region and to extract, as the end point of the road region, an end point of the determined driving lane region.

The processor may be configured to extract the end point of the road region by extracting, as the end point, a pixel at a farthest distance from a side of the vehicle in the input image, among pixels included in the road region.

The sensor may include a first camera configured to acquire a first image included in the input image, and a second camera spaced apart from the first camera and configured to acquire a second image included in the input image. The processor may be configured to determine the visibility distance by determining a pixel disparity corresponding to an end point of one of the first image and the second image.

In another general aspect, a method to control a velocity of a vehicle includes: determining a road region from an input image; determining a visibility distance along the road region; and controlling the velocity of the vehicle based on the determined visibility distance.

The method may further include: extracting a driving lane region of the road region; and extracting an end point of the extracted driving lane region, wherein the determining of the visibility distance includes determining the visibility distance to be a distance between a location of the vehicle and an end point location corresponding to the end point.

The method may further include: determining a center line of the road region; and extracting, as an end point, a pixel at a farthest distance from a side of the vehicle in the input image, among pixels included in the center line, wherein the determining of the visibility distance includes determining the visibility distance to be a distance between a location of the vehicle and an end point location corresponding to the end point.

The controlling of the velocity of the vehicle may include determining a stopping distance for the vehicle based on the visibility distance, calculating a maximum velocity of the vehicle based on the stopping distance, and controlling the velocity of the vehicle based on the maximum velocity.

In another general aspect, an apparatus to control a velocity of a vehicle includes: a camera configured to acquire an input image; and a processor configured to determine a road region from the input image, to determine a visibility distance along the road region based on the input image, and to control the velocity of the vehicle based on the determined visibility distance.

The processor may be further configured to control the velocity of the vehicle based on the determined visibility distance, in response to no object being detected in the road region.

The camera may include a first camera configured to acquire a first image included in the input image, and a second camera spaced apart from the first camera and configured to acquire a second image included in the input image. The processor may be configured to determine the visibility distance by determining a pixel disparity corresponding to an end point of one of the first image and the second image.

The apparatus may further include: a light imaging, detection, and ranging (LiDAR) sensor configured to generate a vicinity distance map with respect to a vicinity of the vehicle, wherein the processor is further configured to extract an end point of the road region from the input image, calibrate the vicinity distance map to the input image, and select a distance corresponding to a distance between a location of the vehicle and a location corresponding to the end point of the road region as the visibility distance, from the vicinity distance map.

Other features and aspects will be apparent from the following detailed description, the drawings, and the claims.

Figure 1:
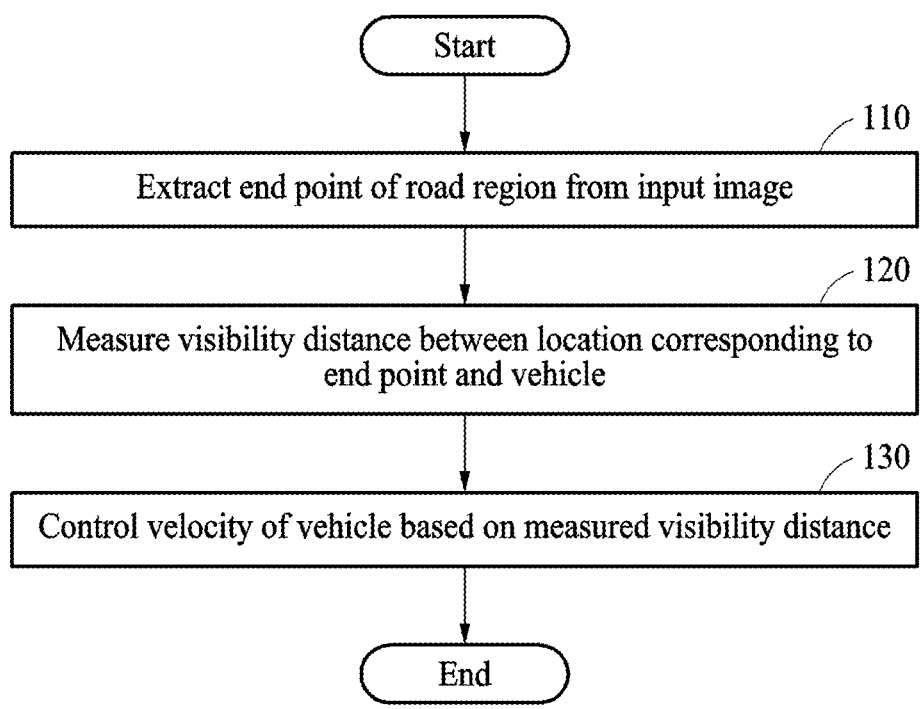
FIG. 1 is a flowchart illustrating an example of a vehicle velocity control method, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration may make the purpose of the examples unnecessarily ambiguous in describing the examples, the detailed description will be omitted here.

The features of the examples described herein may be combined in various ways as will be apparent after an understanding of the disclosure of this application. Further, although the examples described herein have a variety of configurations, other configurations are possible as will be apparent after an understanding of the disclosure of this application.

The following description provides example methods and apparatuses to control a velocity of a vehicle. In the following description, a vehicle may be an automobile such as a car, a sport utility vehicle, or a truck. Additionally, a vehicle may be a motorcycle. As another example, a vehicle may be a drone. However, a vehicle is not limited to the foregoing examples, and other types of vehicles are possible.

FIG. 1 is a flowchart illustrating a vehicle velocity control method, according to an embodiment.

Referring to FIG. 1, in operation 110, a vehicle velocity control apparatus extracts an end point of a road region from an input image. The vehicle velocity control apparatus acquires an input image with respect to an outside of a vehicle. For example, the vehicle velocity control apparatus acquires an input image with respect to a front view from the vehicle. The vehicle velocity control apparatus directly captures the input image using a camera, or receives the input image from an external camera module.

Herein, the road region is a region corresponding to a road in the input image. The road region includes a driving lane region corresponding to a driving lane on which the vehicle including the vehicle velocity control apparatus is currently travelling.

Herein, the end point of the road region is a point at a farthest distance from a side of the vehicle in the input image. For example, the end point of the road region corresponds to a position at a farthest distance on a road from the vehicle, the position being identifiable by the vehicle velocity control apparatus. A process of determining an end point of a road region will be described with reference to FIGS. 2 through 5.

In operation 120, the vehicle velocity control apparatus measures a visibility distance between an end point location corresponding to the end point and a location of the vehicle. In a case in which the input image is a stereoscopic image, the vehicle velocity control apparatus estimates the visibility distance from the input image. An example of estimating a visibility distance using an input image will be described with reference to FIGS. 6 and 7. In another example, the vehicle velocity control apparatus estimates the visibility distance through a separate sensor. For example, the vehicle velocity control apparatus detects the visibility distance using a light imaging, detection, and ranging (LiDAR) sensor (refer to FIG. 8) and a radio detection and ranging (radar) sensor.

Hereinafter, the visibility distance is a maximum distance that is recognizable on a road by the vehicle velocity control apparatus. The end point location corresponding to the end point is an actual physical location indicated by the end point extracted from the input image.

In operation 130, the vehicle velocity control apparatus controls a velocity of the vehicle based on the measured visibility distance. The vehicle velocity control apparatus determines a stopping distance based on the visibility distance, and determines a maximum velocity of the vehicle based on the determined stopping distance. For example, the vehicle velocity control apparatus adjusts the velocity of the vehicle within a range below the maximum velocity. The velocity of the vehicle is a velocity with respect to a longitudinal direction of the vehicle.

In case in which there is no obstacle ahead on the road, the vehicle velocity control apparatus controls the velocity of the vehicle based on the maximum distance that the vehicle is guaranteed to travel. The vehicle velocity control apparatus assumes a worst situation that there is a dangerous object on the road, immediately beyond the visibility distance. For example, it is assumed that an obstacle is present at a farthest point on the road, the point being identifiable by the vehicle velocity control apparatus. Thus, the vehicle velocity control apparatus safely brakes the vehicle even when an obstacle or object, for example, another vehicle, a person, or an animal, that was located outside of a visible range at a predetermined point of view suddenly appears in the visible range.

The vehicle velocity control apparatus measures the visibility distance within which the autonomous vehicle may sense a dangerous object, and decreases the velocity of the vehicle based on the measured visibility distance, thereby ensuring a sufficient braking distance with respect to a potential risk, even in a situation in which an extremely restricted distance is measurable through a sensor in an actual driving environment, for example, a sharply curved road with one side obstructed by a predetermined terrain such as a mountain, or a steep hill.

Figure 2:
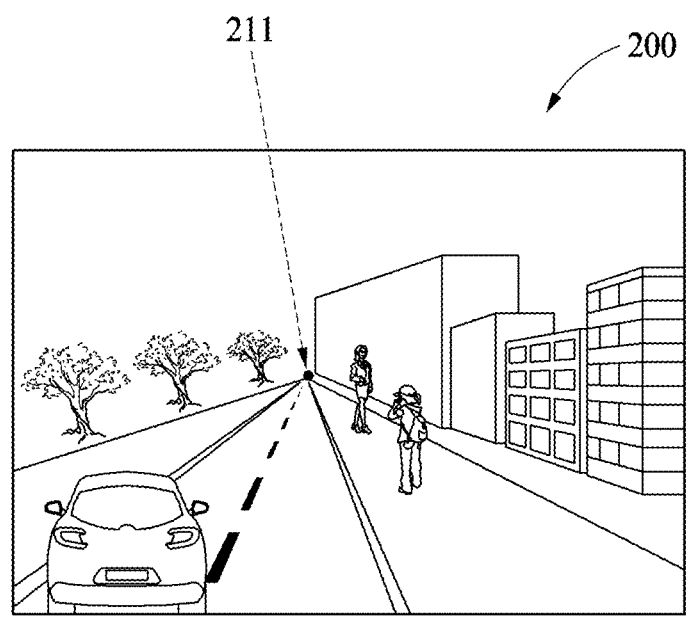
FIGS. 2, 3, 4 and 5 illustrate segmenting an input image into regions, according to embodiments.
Figure 3:
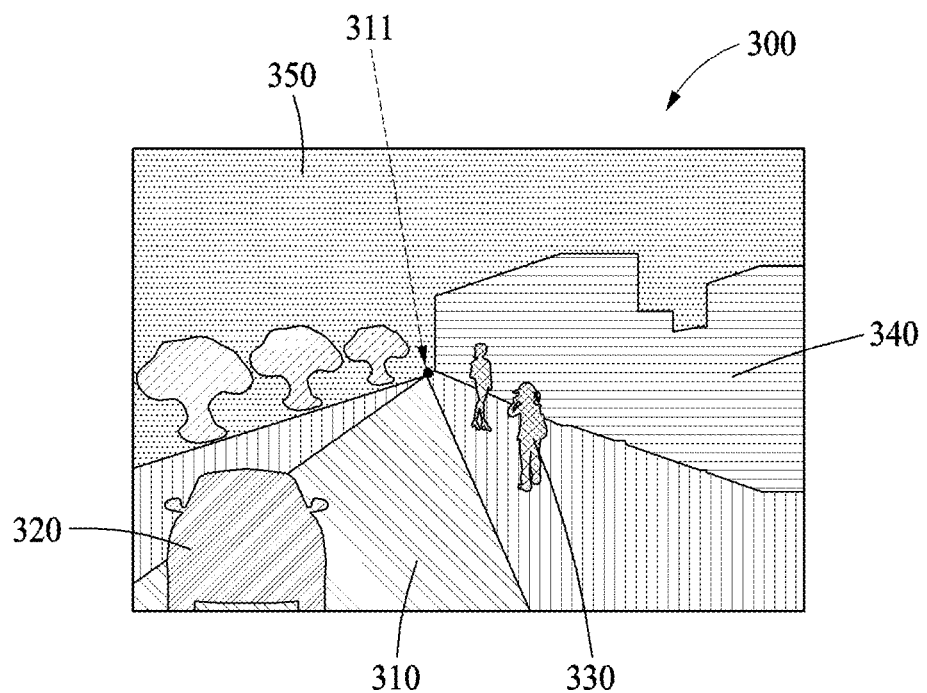
Figure 4:
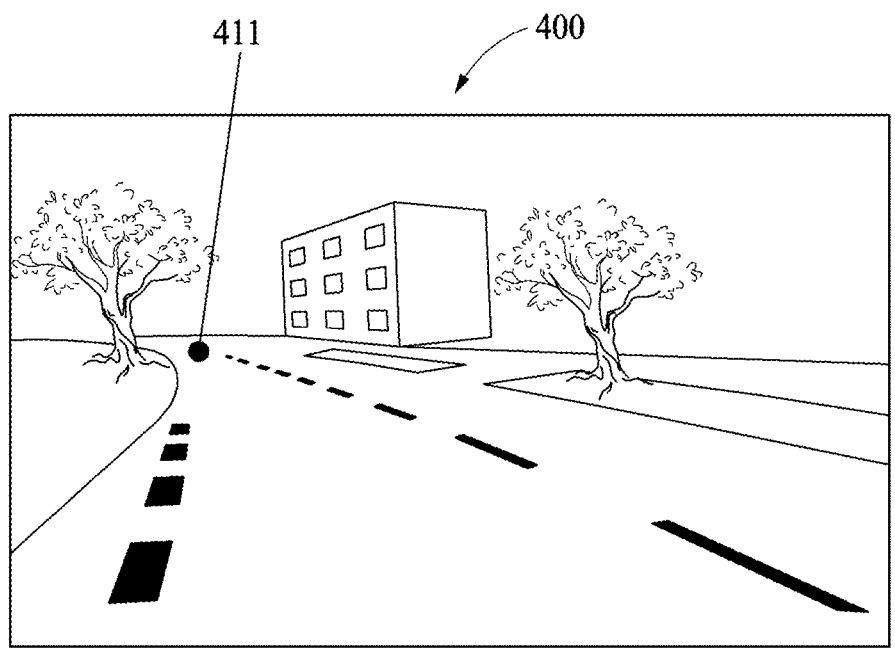
Figure 5:
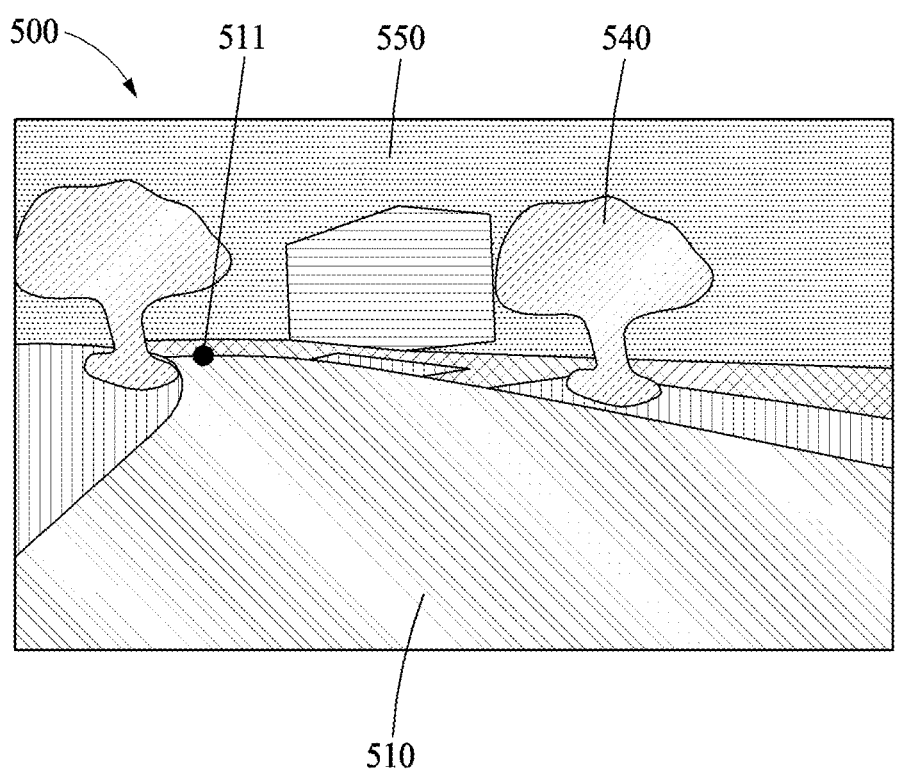

FIGS. 2 through 5 illustrate segmenting an input image into regions, according to embodiments. FIGS. 2 and 3 illustrate examples in which input images acquired by a vehicle velocity control apparatus correspond to straight roads. FIGS. 4 and 5 illustrate examples in which input images acquired by the vehicle velocity control apparatus correspond to curved roads.

The vehicle velocity control apparatus maintains a velocity of a vehicle that guarantees a stopping distance at all times for safe driving. As shown in FIGS. 2 and 4, in a case in which the vehicle velocity control apparatus acquires an input image 200, 400 at a predetermined point of view, the vehicle velocity control apparatus determines a distance obtainable at the point of view at which the input image is acquired. For example, the vehicle velocity control apparatus extracts an end point 211, 311, 411, 511 of a road identifiable through the respective input image 200, 400.

The vehicle velocity control apparatus segments the input image 200, 400 into regions to extract the end point 211, 311, 411, 511 of the road. An image representing the regions acquired by segmenting the respective input image 200, 400 is referred to as a segmented region image 300, 500. The vehicle velocity control apparatus segments the input image into a road region 310, 510, a vehicle region 320, a person region 330, an object region 340, 540, and a background region 350, 550. The road region 310, 510 is a region indicating a road on which the vehicle is to travel, the vehicle region 320 is a region indicating another vehicle located on the road, the person region 330 is a region indicating a person shown in the input image, the object region 340, 540 is a region indicating an object excluding a person, for example, a tree or a building, and the background region 350, 550 is a region indicating a background excluding objects, for example, the sky. However, operations of segmenting the input images into regions not limited to the examples provided herein, and may vary according to design objectives or requirements.

The vehicle velocity control apparatus segments the input image 200, 400 into the regions using a classifier model trained to output a training output from a training image. The classifier model is, for example, a convolutional neural network (CNN). The training image is, for example, a color image, and the training output is a segmented region image of the training input. For example, the training output is a segmented region image acquired by manually designating properties, for example, a vehicle, a person, an object, and a background, corresponding to respective pixels of the training image and segmenting the training image based on the designated properties.

The vehicle velocity control apparatus extracts the end point 311, 511 of the road region 310, 510 from the segmented region image 300, 500. The vehicle velocity control apparatus identifies the road region 310, 510 from the input image 200, 400. The vehicle velocity control apparatus extracts, as the end point 311, 511, a pixel at a farthest distance from a side of the vehicle in the input image 200, 400, among pixels included in the road region 310, 510. However, the operation of extracting the end point 311, 511 is not limited to the examples provided herein. For example, a portion positioned at an uppermost side of the input image in the road region may correspond to the end point 311, 511.

Further, the vehicle velocity control apparatus identifies lane lines from the input image 200, 400. The lane lines are lines to distinguish between lanes. The vehicle velocity control apparatus extracts a driving lane region from the road region 310, 510 based on the lane lines. The driving lane region is a region corresponding to a driving lane, and the driving lane is a lane on which the vehicle including the vehicle velocity control apparatus is currently travelling. The vehicle velocity control apparatus extracts the end point 211, 311, 411, 511 of the extracted driving lane region. For example, the vehicle velocity control apparatus extracts, as the end point 211, 311, 411, 511, a pixel at a farthest distance from a side of the vehicle in the input image 200, 400, among pixels included in the driving lane region.

Figure 6:
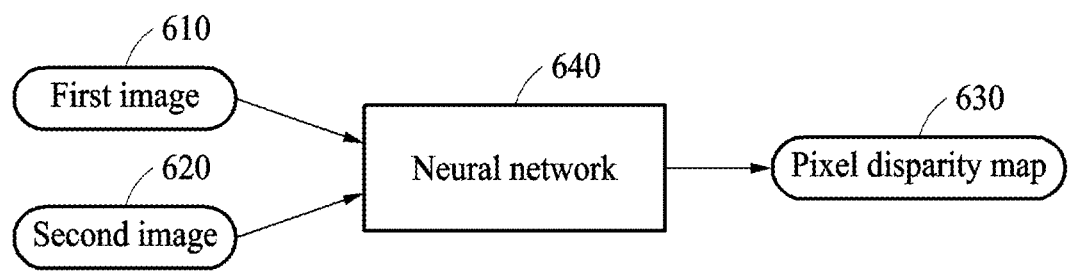
FIG. 6 illustrates calculating a pixel disparity map to measure a visibility distance, according to an embodiment.

FIG. 6 illustrates calculating a pixel disparity map to measure a visibility distance, according to an embodiment.

With respect to the example of FIG. 6, in a case in which an input image is a stereoscopic image, a vehicle velocity control apparatus estimates a visibility distance from a vehicle to an end point location corresponding to an end point using a pixel disparity. In a case of using the pixel disparity, the vehicle velocity control apparatus estimates the visibility distance without using a separate sensor, for example, a LiDAR sensor or a radar sensor, for measuring an actual distance from the vehicle to the end point location.

Herein, the stereoscopic input image is a pair of images that represent the same scene. For example, as illustrated in FIG. 6, the stereoscopic input image includes a first image 610 and a second image 620. The first image 610 is one of a left image and a right image, and the second image 620 is the other one of the left image and the right image. The vehicle velocity control apparatus acquires the first image 610 included in the input image using a first camera, and acquires the second image 620 included in the input image using a second camera spaced apart from the first camera.

Herein, the pixel disparity is a pixel distance between a predetermined pixel in the first image 610 and a corresponding pixel in the second image 620. A pixel disparity calculated with respect to a predetermined pixel in the first image 610 and the second image 620 is used to calculate a distance to a location corresponding to the pixel. An example of the pixel disparity will be described with reference to FIG. 7.

The vehicle velocity control apparatus determines a pixel disparity corresponding to an end point of one of the first image 610 and the second image 620. The vehicle velocity control apparatus generates a pixel disparity map 630 to determine the pixel disparity. For example, the vehicle velocity control apparatus generates the pixel disparity map 630 from the first image 610 and the second image 620, and determines the pixel disparity corresponding to the end point based on the generated pixel disparity map 630. For example, the vehicle velocity control apparatus extracts the pixel disparity map 630 from the first image 610 and the second image 620 using a pixel disparity model. The pixel disparity model is a neural network 640 trained to output a training disparity map from a training image. The training disparity map is a set of pixel disparities designated for respective pixels of the training image. The vehicle velocity control apparatus selects a pixel disparity corresponding to the end point of one of the first image 610 and the second image 620 in the pixel disparity map 630.

In another example, instead of calculating the pixel disparity map 630, the vehicle velocity control apparatus extracts the end point of the first image 610, estimates a corresponding end point in the second image 620, and calculates a pixel disparity between the two end points. The vehicle velocity control apparatus determines the end point of the first image 610 from a road region of the first image 610, and estimates a pixel corresponding to the end point of the first image 610 from the second image 620.

The vehicle velocity control apparatus estimates the pixel corresponding to the end point of the first image 610 in the second image 620 based on an image feature. The image feature is, for example, a scale-invariant feature transform (SIFT) feature. The vehicle velocity control apparatus extracts an image feature from the first image 610 and the second image 620 using an image model, for example, a neural network trained to output an SIFT feature from an image, and estimates a center pixel of a portion having an image feature similar to that of a portion including a pixel corresponding to the end point in the first image 610 as the pixel corresponding to the end point of the first image 610. The vehicle velocity control apparatus determines the estimated pixel to be the end point of the second image 620.

Figure 7:
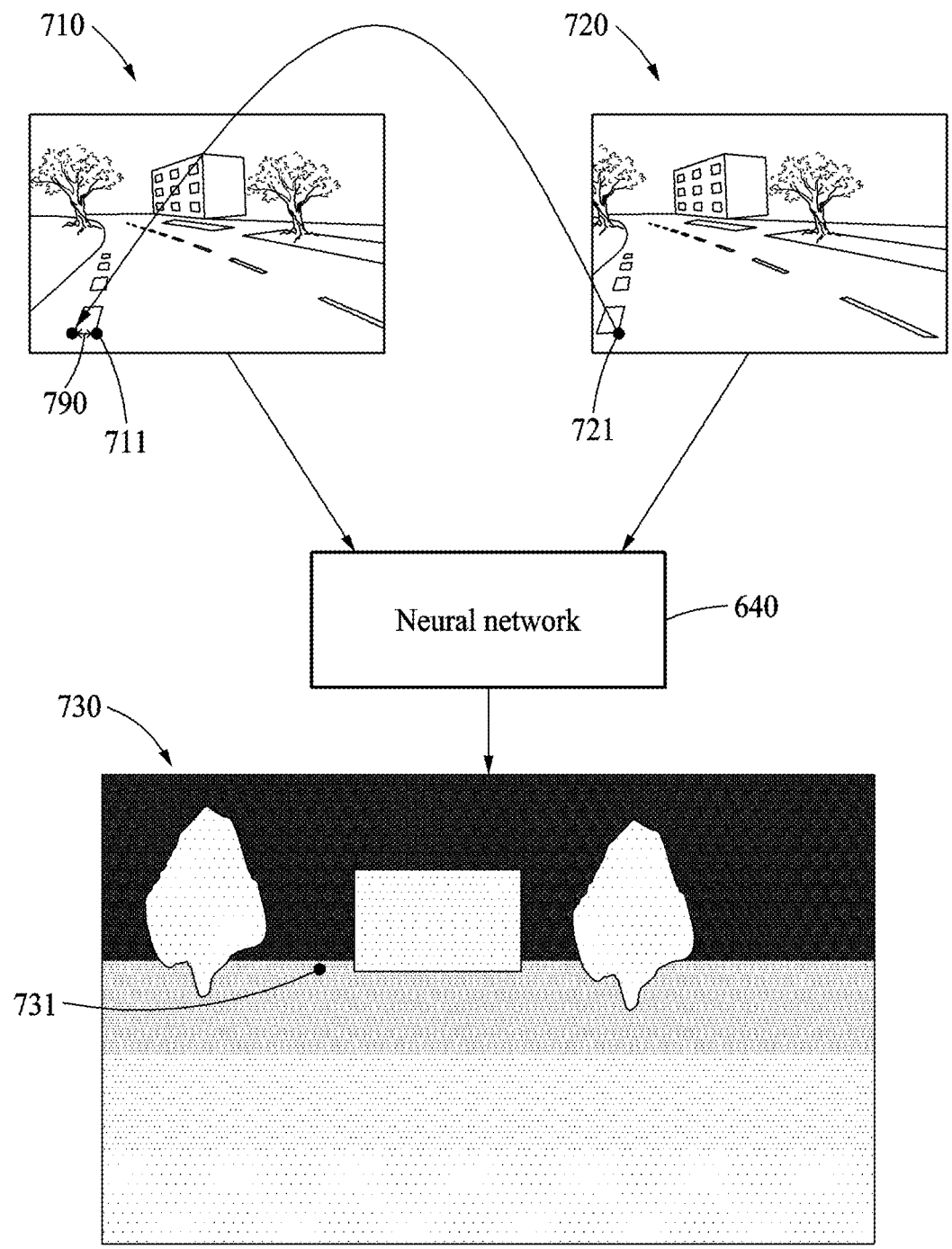
FIG. 7 illustrates measuring a visibility distance using a pixel disparity map, according to an embodiment.

FIG. 7 illustrates measuring a visibility distance using a pixel disparity map, according to an embodiment.

Referring to FIG. 7, a vehicle velocity control apparatus generates a pixel disparity map 730 using the pixel disparity model described with reference to FIG. 6, for example, the neural network 640. The vehicle velocity control apparatus determines a pixel disparity 731 corresponding to an end point from the pixel disparity map 730, and estimates a visibility distance to an end point location based on the pixel disparity 731 corresponding to the end point. As shown in FIG. 7, a pixel disparity 790 indicates a pixel distance between a predetermined pixel 711 in a first image 710 and a corresponding pixel 721 in a second image 720.

The pixel disparity map 730 is a map having intensities corresponding to pixel disparities corresponding to pixels of each of the first image 710 and the second image 720. In the pixel disparity map 730, a pixel disparity increases as a distance between a point and a location of a vehicle which is a criterion decreases, and the pixel disparity decreases as the distance between the point and the location of the vehicle increases. In the pixel disparity map 730 of FIG. 7, a point relatively close to the vehicle has a relatively great pixel disparity and thus is expressed relatively bright, and a point relatively far from the vehicle has a small pixel disparity and thus is expressed relatively dark. However, the pixel disparity map 730 of FIG. 7 is provided as an example for better understanding. Examples are not limited thereto. Each point of the pixel disparity map 730 may be expressed relatively bright as it is at a relatively far distance from the vehicle, and may be expressed relatively dark as it is at a relatively close distance from the vehicle.

The vehicle velocity control apparatus measures the visibility distance based on the pixel disparity 731 corresponding to the end point. The vehicle velocity control apparatus measures the visibility distance further based on a baseline distance between a first camera and a second camera and a focal length of the first camera and the second camera. For example, the vehicle velocity control apparatus measures the visibility distance from the pixel disparity 731 corresponding to the end point based on Equation 1.

$$\text{depth} = \frac{B \cdot f}{\text{disparity}} \quad \text{[Equation 1]}$$

In Equation 1, depth is a depth from the vehicle including the vehicle velocity control apparatus to the end point location, which is the visibility distance. B is the baseline distance between the first camera and the second camera. f is the focal length of the first camera and the second camera. The first camera and the second camera have the same characteristics. disparity denotes the pixel disparity 731 corresponding to the end point. depth and B are actual distance units, which are, for example, one of meter (m), centimeter (cm), and millimeter (mm). f and disparity are expressed in pixel units. Although it is assumed that depth and B are the same in units, and f and disparity are the same in units in Equation 1, unit constants may be incorporated in Equation 1 in a case in which different units are used.

Although it is assumed that a single end point is extracted from an input image in FIGS. 1 through 7, the vehicle velocity control apparatus may also extract multiple end points. For example, in a case in which points farthest from a side of the vehicle, for example, lowermost pixels of the input image, in the road region of the input image have the same pixel distance, the vehicle velocity control apparatus determines multiple end points. Furthermore, in a case in which the input image is a stereoscopic image, the vehicle velocity control apparatus determines multiple end points from a first image, and determines multiple end points from a second image. The vehicle velocity control apparatus calculates disparities between the end points of the first image and the end points of the second image, respectively. The vehicle velocity control apparatus determines a disparity statistical value of the calculated disparities to be the pixel disparity. The disparity statistical value is a statistical value with respect to the disparities, for example, a mean value or a median value of the disparities.

Figure 8:
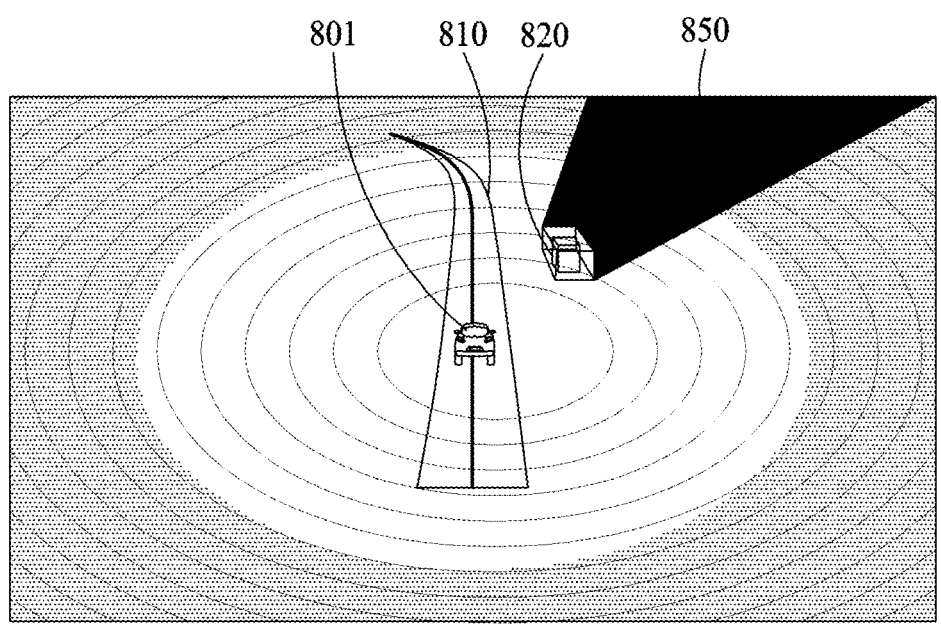
FIG. 8 illustrates measuring a distance using a light imaging, detection, and ranging (LiDAR) sensor, according to an embodiment.

FIG. 8 illustrates measuring a distance using a LiDAR sensor, according to an embodiment.

Referring to FIG. 8, a vehicle velocity control apparatus measures a visibility distance from a vehicle 801 to an end point location through a separate sensor. For example, the vehicle velocity control apparatus generates a vicinity distance map with respect to a vicinity of the vehicle 801 using a LiDAR sensor. The LiDAR sensor is a sensor that obtains a vicinity distance map in real time by radiating multiple laser beams toward the vicinity, for example, a front side, at a predetermined angle, and analyzing a time of flight of a reflected laser beam. The vicinity distance map is represented as a three-dimensional (3D) depth image. As shown in FIG. 8, the vehicle velocity control apparatus obtains a vicinity distance map by radiating laser beams toward the vicinity of the vehicle 801.

The vicinity distance map represents a distance from the vehicle 801 and an object 820 that exists in the vicinity of the vehicle 801. Further, the vicinity distance map also represents a distance to each location on a road 810. However, because the vicinity distance map, which is obtained using the LiDAR sensor, is obtainable based on reflection of the laser beams radiated toward the object 820, the vicinity distance map does not include information related to a region 850 behind the object 820 from the vehicle 801.

The vehicle velocity control apparatus calibrates the vicinity distance map to the input image. The vehicle velocity control apparatus segments at least a portion of the vicinity distance map, and matches the segmented distance map to the input image. The vehicle velocity control apparatus maps each point of the segmented distance map to a corresponding pixel in the input image.

The vehicle velocity control apparatus selects a distance corresponding to the end point of the input image as the visibility distance, from the vicinity distance map.

Figure 9:
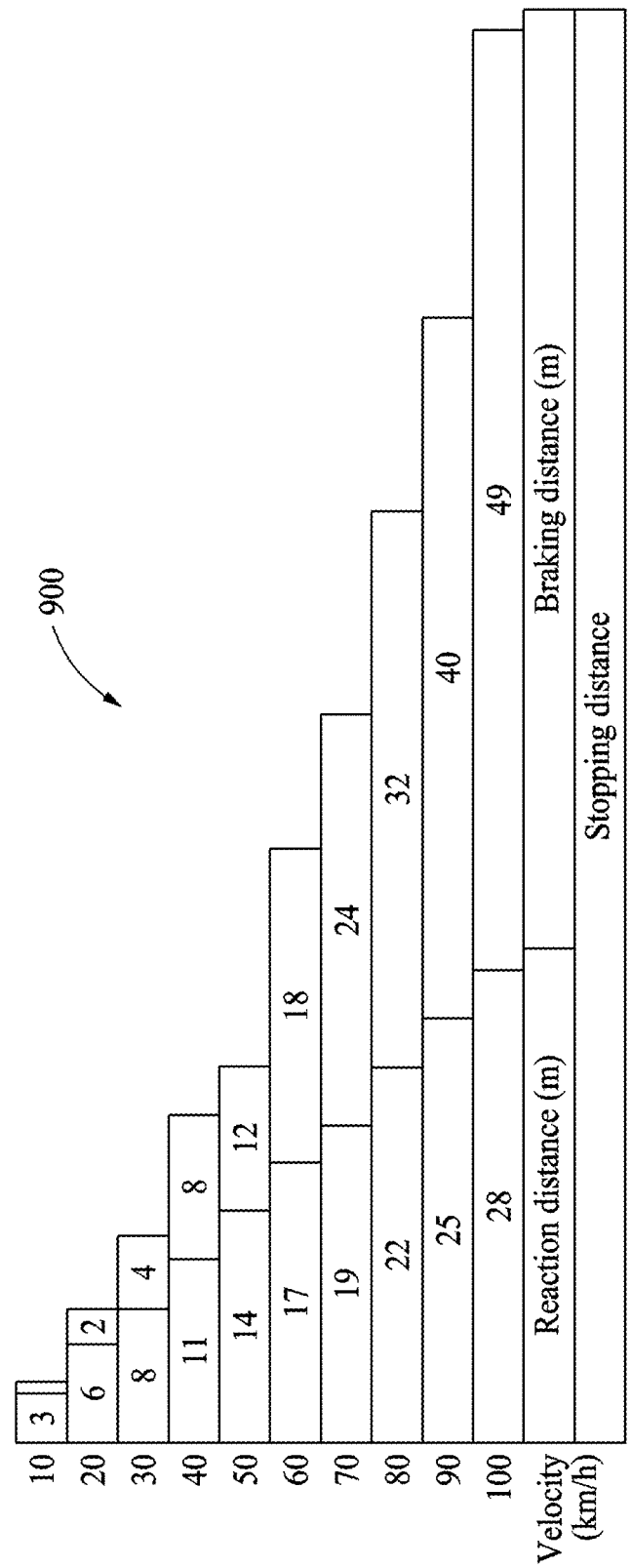
FIG. 9 illustrates calculating a stopping distance, according to an embodiment.

FIG. 9 illustrates a stopping distance, according to an embodiment.

A vehicle velocity control apparatus determines a stopping distance for a vehicle based on a visibility distance. The vehicle velocity control apparatus determines the visibility distance to be the stopping distance for the vehicle. In another example, the vehicle velocity control apparatus sets the stopping distance in proportion to the visibility distance. Thus, the vehicle velocity control apparatus sets a maximum distance identifiable through an input image as the stopping distance. However, methods of determining and setting a stopping distance are not limited to the foregoing examples. The vehicle velocity control apparatus adjusts the determined stopping distance based on the visibility distance, in response to reception of a user input. The user input is an input received from a user, and includes an operation/instruction to set the stopping distance. For example, the vehicle velocity control apparatus sets the stopping distance to be shorter than the visibility distance in response to the user input, thereby enabling the vehicle to travel more safely. In another example, the vehicle velocity control apparatus sets the stopping distance to be longer than the visibility distance in response to the user input, thereby enabling the vehicle to travel faster.

The vehicle velocity control apparatus calculates a maximum velocity of the vehicle based on the stopping distance. More specifically, the vehicle velocity control apparatus calculates the maximum velocity from the stopping distance based on maximum velocity information 900. The maximum velocity information 900 is information that defines a reaction distance, a braking distance, and a stopping distance required with respect to a predetermined velocity. The example maximum velocity information 900 of FIG. 9 is information provided in South Korea.

For example, the maximum velocity information 900 is implemented in a form of data of a lookup table. The vehicle velocity control apparatus calculates a maximum velocity corresponding to a current stopping distance from the maximum velocity information 900. FIG. 9 also shows reaction distances. A reaction distance is a distance quantified with respect to a time it takes for a user to perceive an object ahead and respond to perceiving the object. The vehicle velocity control apparatus uses only a braking distance as the stopping distance. Thus, the vehicle velocity control apparatus excludes the reaction distance with respect to the vehicle, and determines the maximum velocity of the vehicle based on the braking distance.

Further, the vehicle velocity control apparatus adjusts the velocity of the vehicle to be less than or equal to the maximum velocity. In response to another no object being detected on the road region, the vehicle velocity control apparatus adjusts the velocity of the vehicle to be the maximum velocity. Thus, the vehicle velocity control apparatus adjusts the velocity of the vehicle based on a distance obtainable within a current visible range, thereby performing safe driving even in a situation in which an object, such as another vehicle, is absent ahead.

In another example, the vehicle velocity control apparatus sets a danger level in response to a user input. The vehicle velocity control apparatus adjusts either one of the stopping distance and the maximum velocity based on the set danger level. For example, as the danger level is set to be relatively high, it implies that the user wants to drive at a relatively high risk. Thus, the vehicle velocity control apparatus enables the vehicle to travel at a fast velocity. Conversely, as the danger level is set to be relatively low, it implies that the user wants to drive safely. Thus, the vehicle velocity control apparatus enables the vehicle to travel at a slow velocity. Accordingly, the vehicle velocity control apparatus defines the stopping distance or the braking distance based on a level of safety assurance, and calculates the maximum velocity that maintains the defined braking distance.

In another example, the vehicle velocity control apparatus obtains the maximum velocity information 900 corresponding to a location of the vehicle based on the location of the vehicle. For example, a nation, a region, and a state in which the vehicle is located have different regulations regarding a stopping distance. The vehicle velocity control apparatus flexibly obtains the maximum velocity information 900 based on the current location of the vehicle. The vehicle velocity control apparatus receives the maximum velocity information 900 from an external device through communication, or retrieves the maximum velocity information 900 corresponding to the current location from an internal database. The vehicle velocity control apparatus calculates the maximum velocity of the vehicle from the stopping distance based on the maximum velocity information 900 corresponding to the current location.

For example, the U.S. state of California provides a formula related to a braking distance, a vehicle length, and a velocity as maximum velocity information. The vehicle velocity control apparatus calculates the maximum velocity based on the stopping distance and the length of the vehicle. The braking distance corresponds to a product of the length of the vehicle and the velocity.

Figure 10:
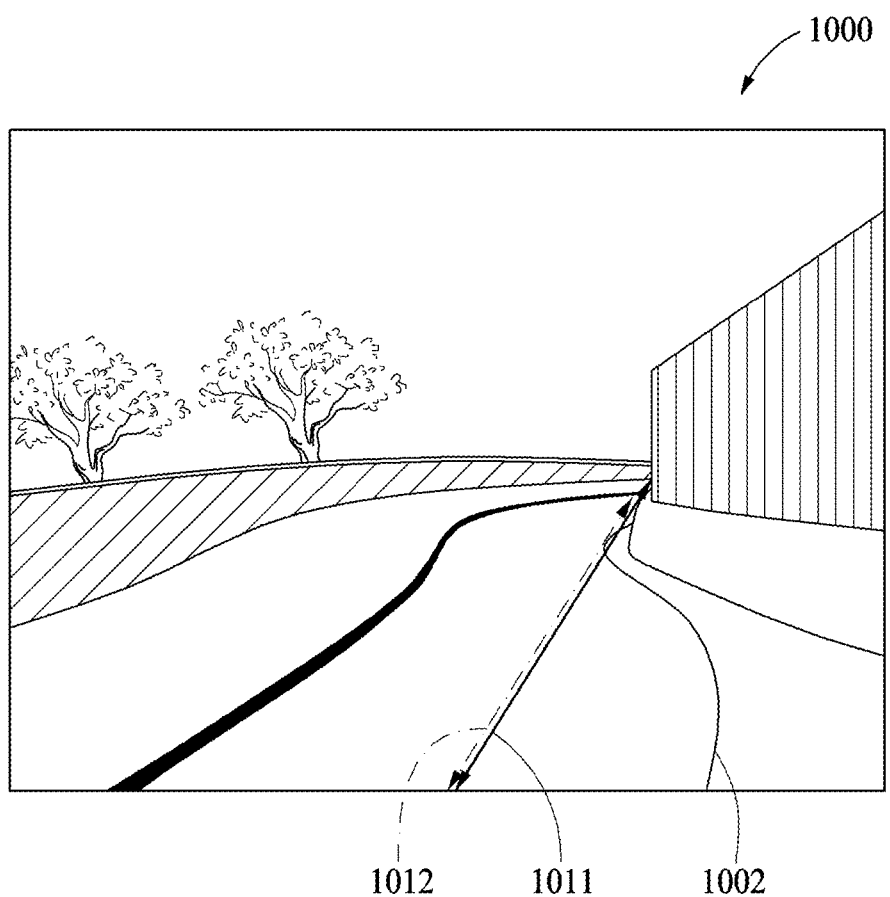
FIGS. 10 and 11 illustrate visibility distances on curved roads with obstacles, according to embodiments.
Figure 11:
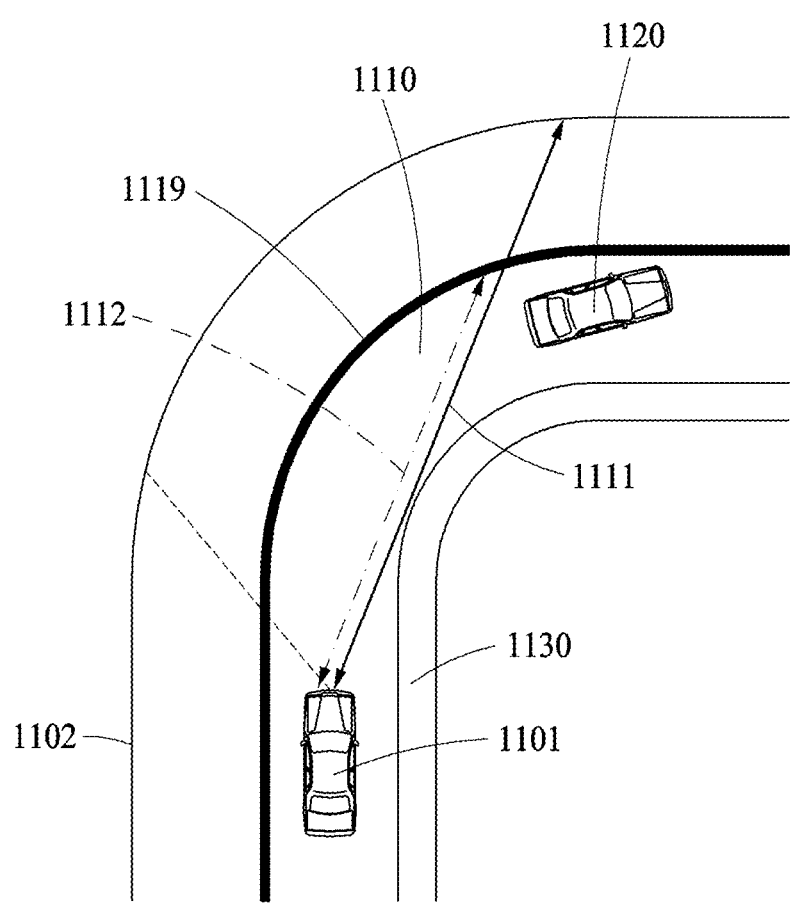

FIGS. 10 and 11 illustrate visibility distances 1011 and 1111 on curved roads 1002 and 1102 with obstacles, according to an embodiment.

Referring to FIG. 11, in a case in which it is uncertain whether a dangerous object 1120, for example, an object presenting a risk of collision, is present behind an obstacle 1130, for example, a wall or a cliff, due to the obstacle 1130 being located on an inner side of a curve on the curved road 1002, 1102, a vehicle velocity control apparatus assumes that the dangerous object 1120 is present at an end point location of the road.

Referring to FIGS. 10 and 11, similar to the description provided with reference to FIGS. 1 through 9, the vehicle velocity control apparatus determines a visibility distance 1011, 1111 to the end point location of the road based on an input image 1000.

However, an end point of the road is not limited to the examples shown. The vehicle velocity control apparatus may also determine an end point based on a driving lane of the road.

Still referring to FIGS. 10 and 11, the vehicle velocity control apparatus identifies a road region and a center line 1119 on the road region from the input image 1000. The vehicle velocity control apparatus extracts, as an end point, a pixel at a farthest distance from a side of a vehicle 1101 in the input image 1000, among pixels included on the center line 1119. In this example, the vehicle velocity control apparatus determines a distance to an end point location on a driving lane 1110 of the road to be the visibility distance 1012, 1112.

Furthermore, the vehicle velocity control apparatus determines an obtainable stopping distance based on the visibility distance and a line shape of a driving road of the vehicle 1101. In a case of the curved road of FIG. 10, the vehicle velocity control apparatus determines a stopping distance longer than the visibility distance 1111, 1112 to the end point location based on a curvature of the road. The vehicle velocity control apparatus calculates a maximum velocity of the vehicle 1101 based on the stopping distance.

Figure 12:
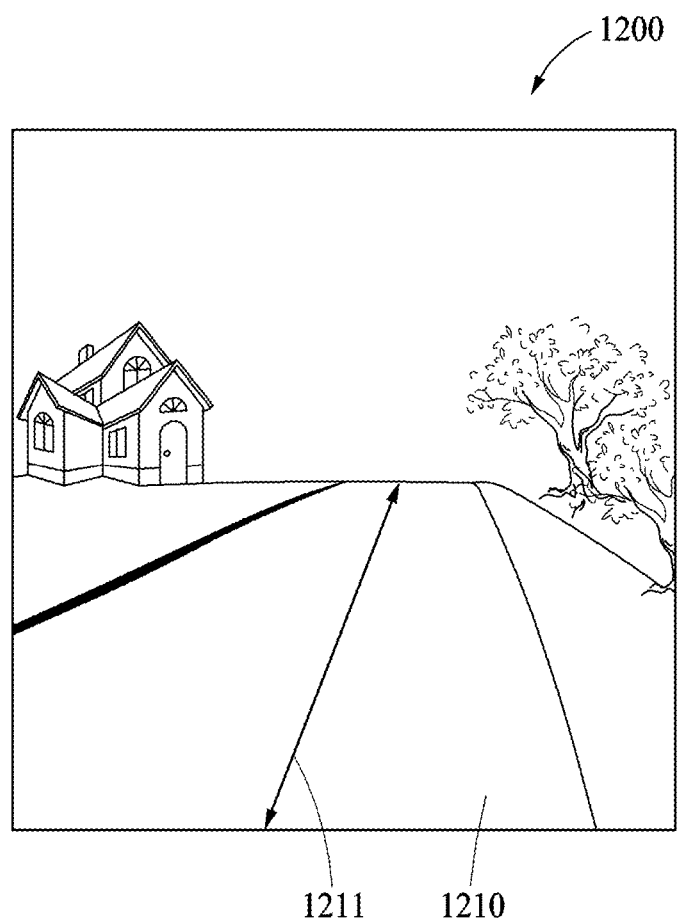
FIGS. 12 and 13 illustrate visibility distances on sloping roads, according to embodiments.
Figure 13:
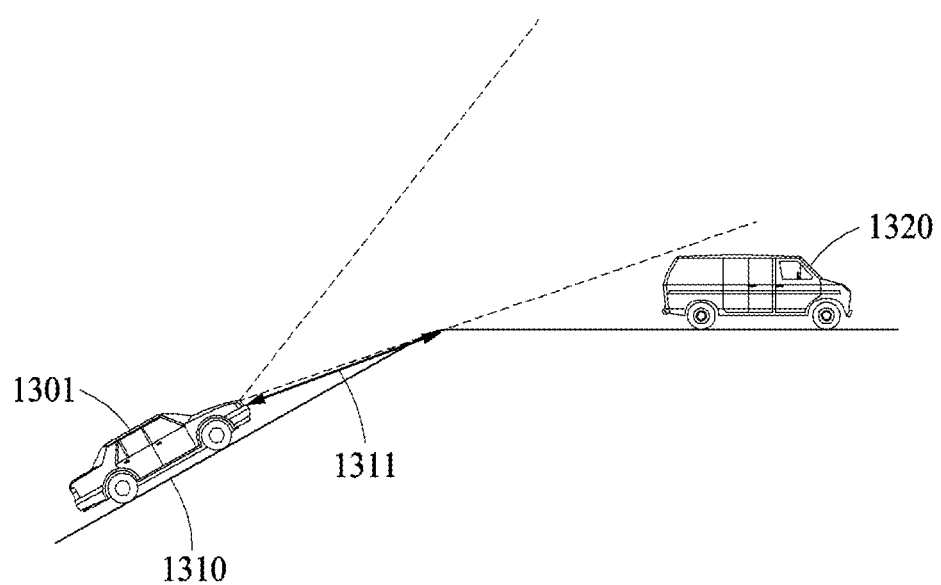

FIGS. 12 and 13 illustrate visibility distances 1211 and 1311 on sloping roads 1210 and 1310, according to embodiments.

Referring to FIGS. 12 and 13, in a case in which it is uncertain whether an obstacle is present over a hill on the sloping road 1210, 1310, a vehicle velocity control apparatus assumes that a dangerous object 1320 is present at an end point location of the road 1210, 1310.

In a case in which the road 1210, 1310 is an uphill road, there may be pixels at the same height with respect to a road region in an input image 1200. In this example, the vehicle velocity control apparatus determines end points with respect to the road region. In response to the end points being extracted, the vehicle velocity control apparatus determines a statistical value of distances between respective end point locations corresponding to the end points and a location of the vehicle to be the visibility distance 1211, 1311. For example, the vehicle velocity control apparatus determines a mean value or a median value of the distances between the end point locations and the location of the vehicle to be the visibility distance 1211, 1311. Thus, the vehicle velocity control apparatus enables a vehicle 1301 to travel at a safe velocity even in a case in which a dangerous object is absent on the hill.

Figure 14:
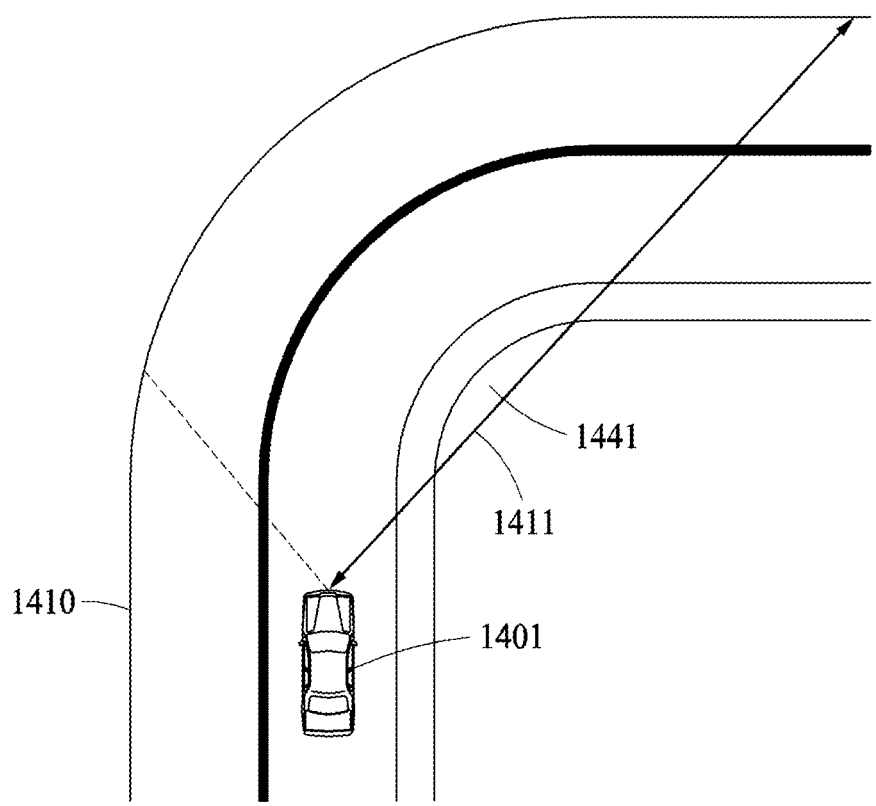
FIG. 14 illustrates a visibility distance on a curved road without an obstacle, according to an embodiment.

FIG. 14 illustrates a visibility distance 1411 on a curved road 1410 without an obstacle, according to an embodiment.

A vehicle velocity control apparatus determines a distance to an end point of the curved road 1410 on which an obstacle is absent to be the visibility distance 1411. Thus, the vehicle velocity control apparatus quickly determines a velocity of a vehicle 1401 on a flat terrain 1441 on which an obstacle is absent, unlike a terrain on which an obstacle is present.

Figure 15:
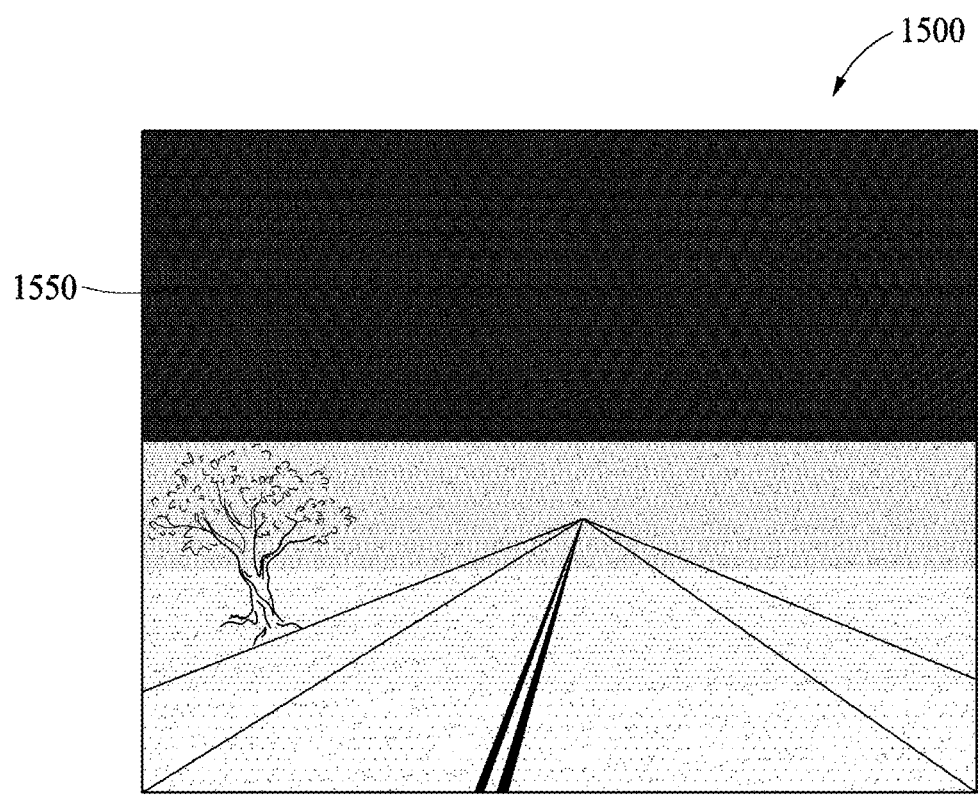
FIGS. 15 and 16 illustrate a visibility distance with respect to weather conditions, according to an embodiment.
Figure 16:
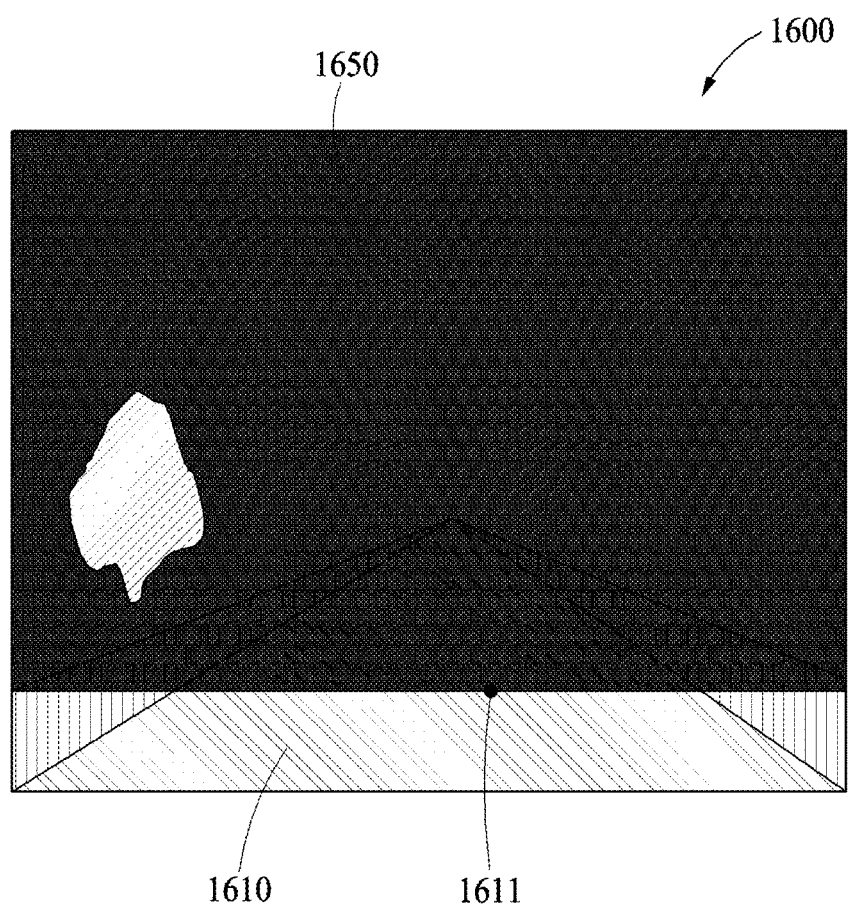

FIGS. 15 and 16 illustrate a visibility distance with respect to weather conditions, according to an embodiment.

Referring to FIG. 15, a vehicle velocity control apparatus enables a vehicle to travel safely based on a weather condition. In a bad weather condition, a visible range of the vehicle is restricted. For example, FIG. 15 is an input image 1500 acquired in a situation in which a visible range is restricted by fog 1550.

The vehicle velocity control apparatus excludes an invisible region 1650 from the input image 1500. Referring to FIG. 16, the vehicle velocity control apparatus identifies a road region 1610 from the input image 1500 from which the invisible region 1650 is excluded. For example, as shown in FIG. 16, the vehicle velocity control apparatus generates a region image 1600 excluding the invisible region 1650 from the input image 1500. The vehicle velocity control apparatus determines an end point 1611 based on the road region 1610 identified from the region image 1600 excluding the invisible region 1650.

Thus, the vehicle velocity control apparatus determines a maximum distance within which a visible range is obtained to be a visibility distance, thereby preventing a potential risk of collision, for example, a sudden appearance of an object that was invisible due to fog, in a situation in which a visible range decreases due to a weather condition.

Figure 17:
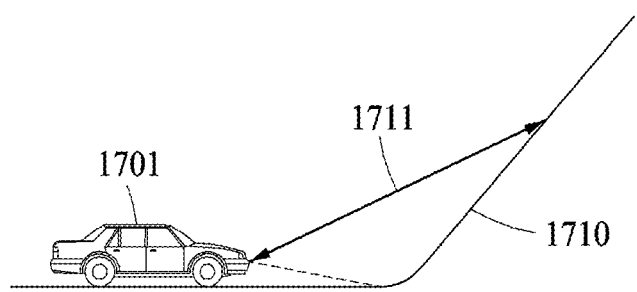
FIG. 17 illustrates a visibility distance on a sloping road, according to an embodiment.

FIG. 17 illustrates a visibility distance 1711 on a sloping, uphill road 1710, according to an embodiment.

Referring to FIG. 17, in a case in which a vehicle 1701 enters the uphill road 1710, a vehicle velocity control apparatus determines the visibility distance 1711 based on a visible range obtainable with respect to the uphill road 1710. A visible range of the vehicle velocity control apparatus is restricted by a slope of the uphill road 1710. Thus, the visibility distance 1711 decreases, and the vehicle velocity control apparatus reduces a velocity of the vehicle 1701 based on the decreasing visibility distance 1711.

Figure 18:
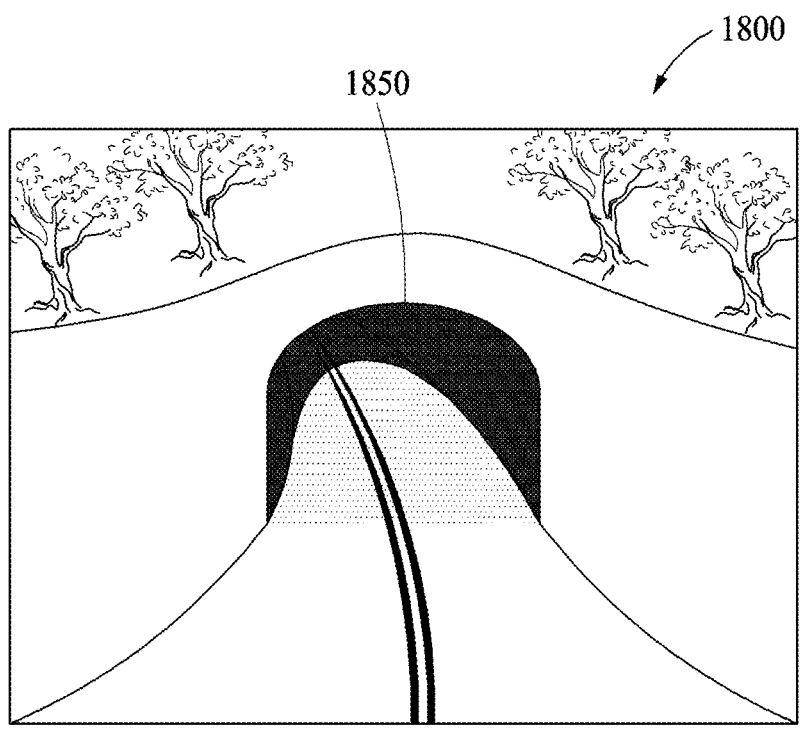
FIGS. 18 and 19 illustrate a visibility distance when entering tunnels, according to an embodiment.
Figure 19:
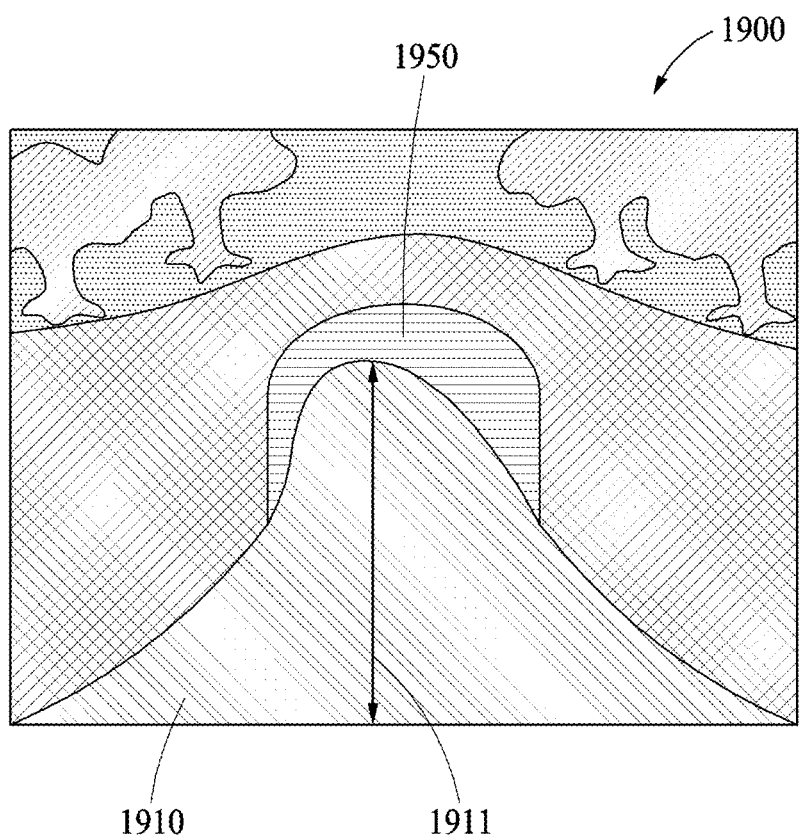

FIGS. 18 and 19 illustrate a visibility distance when entering tunnels, according to an embodiment.

In a case in which a vehicle enters a shaded area, for example, a tunnel, a vehicle velocity control apparatus determines a visibility distance based on a visible range obtainable with respect to the shaded area.

Referring to FIG. 18, for example, the vehicle velocity control apparatus acquires an input image 1800 before the vehicle enters a tunnel. In the daytime, lighting is dim in a tunnel. Thus, an invisible region 1850 appears in the input image 1800. As shown in FIG. 10, the vehicle velocity control apparatus generates a region image 1900 by segmenting the input image 1800 into regions. The vehicle velocity control apparatus excludes an invisible region 1950 from a road region 1910 in the region image 1900. The vehicle velocity control apparatus determines the visibility distance 1911 based on the road region 1910 from which the invisible region 1950 is excluded.

Thus, the vehicle velocity control apparatus determines a velocity of the vehicle based on the visibility distance 1911, thereby preventing a risk of collision even in a situation that there may be a potential dangerous object due to the invisible region 1850, 1950 before the vehicle enters the shaded area.

Figure 20:
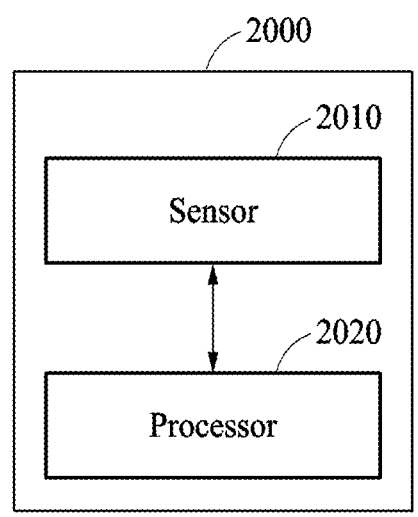
FIGS. 20, 21 and 22 are block diagrams illustrating vehicle velocity control apparatuses, according to embodiments.
Figure 21:
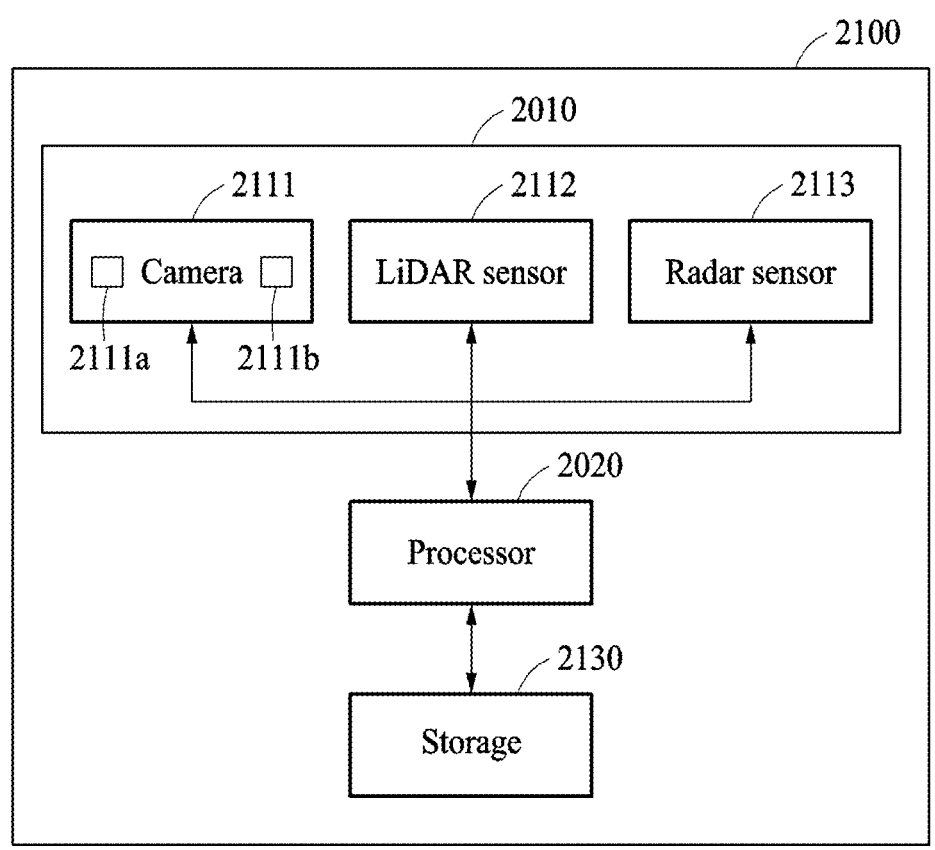
Figure 22:
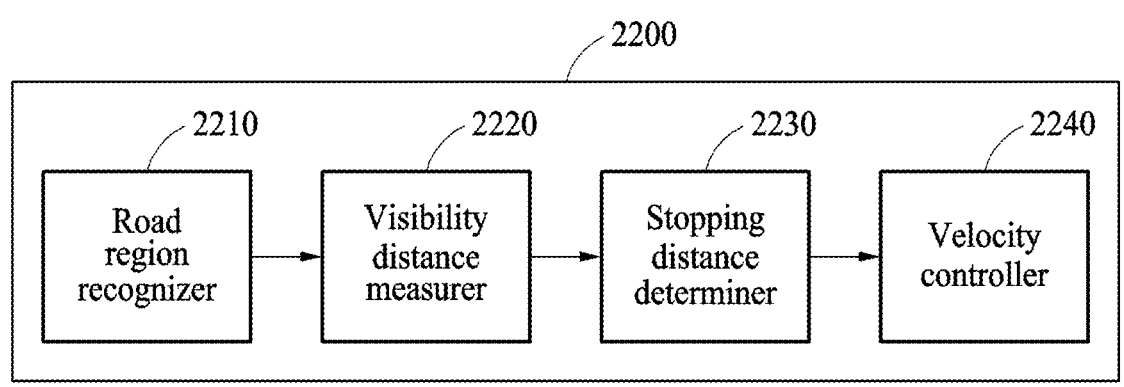

FIGS. 20 through 22 are block diagrams illustrating vehicle velocity control apparatuses 2000, 2100 and 2200, according to embodiments.

Referring to FIG. 20, the vehicle velocity control apparatus 2000 includes a sensor 2010 and a processor 2020. The sensor 2010 acquires an input image. For example, the sensor 2010 is an image sensor that captures the input image.

The processor 2020 extracts an end point of a road region from the input image, determines a visibility distance between an end point location corresponding to the end point and a location of a vehicle, and controls a velocity of the vehicle based on the measured visibility distance. However, the operation of the processor 2020 is not limited to the foregoing operations, and the processor 2020 may also perform the operations described with reference to FIGS. 1 through 19.

In the vehicle velocity control apparatus 2100 of FIG. 21, the sensor 2010 includes a camera 2111 including a first camera 2111a and a second camera 2111b that are spaced apart from each other along a baseline, and acquires a stereoscopic image as the input image using the first camera 2111a and the second camera 2111b. Additionally, the sensor 2010 of the vehicle velocity control apparatus 2100 further includes a distance sensor.

The camera 2111 captures an image of an outside of a vehicle as described above. The camera 2111 is attached to the vehicle toward a front side of the vehicle to capture an image with respect to a front view from the vehicle. For example, the camera 2111 captures a stereoscopic image. However, the camera 2111 is not limited to the disclosed example. The camera 2111 may also include an optical sensor that captures an image based on an infrared ray and a visible ray, and an ultrasonic sensor that captures an ultrasonic image based on an ultrasonic wave. The camera 2111 may be implemented as various types of sensors that continually capture a predetermined visible range.

The distance sensor is a sensor that measures a distance with respect to a vicinity of the vehicle. The distance sensor measures a distance with respect to a road or an object in the vicinity of the vehicle. For example, as shown in FIG. 21, the distance sensor includes a LiDAR sensor 2112 and a radar sensor 2113. However, the type of the distance sensor is not limited to the foregoing examples.

As described with reference to FIG. 8, the LiDAR sensor 2112 is a sensor that obtains a vicinity distance map in real time by radiating multiple laser beams toward a vicinity, for example, a front side, at a predetermined angle and analyzing a time of flight of a reflected laser beam. The radar sensor 2113 is a sensor that obtains a vicinity distance map in real time by radiating electromagnetic waves at a predetermined angle and analyzing a reflected electromagnetic wave.

Still referring to FIG. 21, a storage 2130 stores program instructions for controlling the processor 2020 to perform the operations described with reference to FIGS. 1 through 19. Further, the storage 2130 stores a classifier model configured to segment an input image, a pixel disparity model configured to estimate a pixel disparity, and an image model configured to estimate corresponding points in a stereoscopic image. The storage 2130 updates and stores the classifier, pixel disparity, and image models. Further, the storage 2130 temporarily or semi-permanently stores a variety of information required to perform a vehicle velocity control method, for example, an input image, a pixel disparity map, maximum distance information, and a vicinity distance map.

In the embodiment of FIG. 22, the vehicle velocity control apparatus 2200 is implemented as an apparatus including a road region recognizer 2210, a visibility distance measurer 2220, a stopping distance determiner 2230, and a velocity controller 2240.

The road region recognizer 2210 is a module that recognizes a road region from an input image, and includes at least one processor. For example, the road region recognizer 2210 segments an input image into regions based on properties, for example, a road, an object, and a background, and selects a road region from the regions.

The visibility distance measurer 2220 is a module that measures a visibility distance to an end point location corresponding to an end point of a road region. The visibility distance measurer 2220 includes at least one processor that estimates the visibility distance to the end point location. In another example, the visibility distance measurer 2220 includes a sensor that measures an actual visibility distance to the end point location.

The stopping distance determiner 2230 is a module that determines a stopping distance based on the visibility distance. The stopping distance determiner 2230 includes at least one processor that sets the visibility distance as the stopping distance. Further, the stopping distance determiner 2230 adjusts the stopping distance in response to a user input.

The velocity controller 2240 is a module that controls a velocity of the vehicle. The velocity controller 2240 includes at least one processor that determines the velocity of the vehicle based on maximum velocity information. Further, the velocity controller 2240 enables the vehicle to travel at the determined velocity.

The processors included in the road region recognizer 2210, the visibility distance measurer 2220, the stopping distance determiner 2230, and the velocity controller 2240 may be implemented as a single processor or a plurality of processors.

The sensor 2010, the processor 2020, the camera 2111, the LiDAR sensor 2112, the radar sensor 2113, the storage 2130, the road region recognizer 2210, the visibility distance measurer 2220, the stopping distance determiner 2230, and the velocity controller 2240 in FIGS. 20-22 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to control a velocity of a vehicle, the method comprising:
    acquiring a first image of a road on which the vehicle travels using a first camera of the vehicle;
    acquiring a second image of the road on which the vehicle travels using a second camera of the vehicle;
    determining, from the first image, a first road region of the road on which the vehicle is traveling;
    determining, from the second image, a second road region of the road on which the vehicle is traveling;
    extracting a plurality of first end points of the first road region from the first image;
    extracting a plurality of second end points of the second road region from the second image;
    determining a plurality of pixel disparities between the plurality of first end points and the plurality of second end points;
    measuring a visibility distance between a position on the road corresponding to the plurality of first end points and the plurality of second end points, and a location of the vehicle, based on the plurality of pixel disparities; and
    controlling the velocity of the vehicle based on the visibility distance.

2. The method of claim 1, wherein the extracting of the plurality of first end points and the plurality of second end points comprises:
    identifying lane lines from the first image and the second image,
    extracting a driving lane region from the first road region and the second road region based on the lane lines, and
    extracting, as the plurality of first end points and the plurality of second end points, end points of the driving lane region.

3. The method of claim 1, wherein the extracting of the plurality of first end points and the plurality of second end points comprises:
    extracting, as the plurality of first end points and the plurality of second end points, pixels at farthest distances from a side of the vehicle in the first image and the second image, among pixels included in the first road region and the second road region.

4. The method of claim 1, wherein the extracting of the plurality of first end points and the plurality of second end points comprises:
identifying a center line on the first road region and the second road region from the first image and the second image; and
extracting, as the plurality of first end points and the plurality of second end points, pixels at farthest distances from a side of the vehicle in the first image and the second image, among pixels included in the center line.

5. The method of claim 1, wherein the determining of the plurality of pixel disparities comprises:
extracting a pixel disparity map from the first image and the second image using a pixel disparity model that is trained to output a training display map from a training image, and
selecting the plurality of pixel disparities corresponding to the plurality of first end points and the plurality of second end points in the pixel disparity map.

6. The method of claim 1, wherein the measuring of the visibility distance based on the plurality of pixel disparities comprises measuring the visibility distance further based on a baseline distance between the first camera and the second camera, and a focal length of the first camera and the second camera.

7. The method of claim 1, wherein the extracting the plurality of first end points and the plurality of second end points comprises:
estimating pixels corresponding to the plurality of first end points of the first image from the second image; and
determining the pixels as the plurality of second end points of the second image.

8. The method of claim 1, wherein the measuring of the visibility distance comprises:
generating a vicinity distance map with respect to a vicinity of the vehicle using a light imaging, detection, and ranging (LiDAR) sensor;
calibrating the vicinity distance map to the first image and the second image; and
selecting a distance corresponding to the plurality of first end points and the plurality of second end points as the visibility distance, from the vicinity distance map.

9. The method of claim 1, wherein the controlling of the velocity of the vehicle comprises:
determining a stopping distance for the vehicle based on the visibility distance;
calculating a maximum velocity of the vehicle based on the stopping distance; and
adjusting the velocity of the vehicle to be less than or equal to the maximum velocity.

10. The method of claim 9, wherein the calculating of the maximum velocity of the vehicle comprises calculating the maximum velocity of the vehicle further based on a length of the vehicle.

11. The method of claim 9, further comprising:
adjusting either one or both of the stopping distance and the maximum velocity in response to reception of a user input.

12. The method of claim 9, wherein the calculating of the maximum velocity of the vehicle comprises:
obtaining maximum velocity information corresponding to the location of the vehicle based on the location of the vehicle; and
calculating the maximum velocity of the vehicle further based on the maximum velocity information.

13. The method of claim 9, wherein the adjusting of the velocity of the vehicle comprises adjusting the velocity of the vehicle to be the maximum velocity in response to no object being detected.

14. The method of claim 1, further comprising:
determining a statistical value of distances between respective end point locations corresponding to the plurality of first end points and the plurality of second end points and the location of the vehicle to be the visibility distance.

15. The method of claim 1, wherein the controlling of the velocity of the vehicle comprises:
determining an obtainable stopping distance based on the visibility distance and a line shape of the road, and
calculating a maximum velocity of the vehicle based on the obtainable stopping distance.

16. The method of claim 1, wherein the controlling of the velocity of the vehicle comprises:
excluding a reaction distance with respect to the vehicle; and
determining a maximum velocity of the vehicle based on a braking distance.

17. A non-transitory computer-readable storage medium storing instructions that, when executed by a processor, cause the processor to perform the method of claim 1.

18. An apparatus to control a velocity of a vehicle, the apparatus comprising:
a first camera configured to acquire a first image of a road on which the vehicle travels;
a second camera configured to acquire a second image of the road on which the vehicle travels; and
a processor configured to:
determine, from the first image, a first mad region of the road on which the vehicle is traveling;
determine, from the second image, a second road region of the road on which the vehicle is traveling;
extract a plurality of first end points of the first road region from the first image;
extract a plurality of second end points of the second road region from the second image; determining a plurality of pixel disparities between the plurality of first end points and the plurality of second end points;
measure a visibility distance between a position on the mad corresponding to the plurality of first end points and the plurality of second end points, and a location of the vehicle, based on the plurality of pixel disparities; and
control the velocity of the vehicle based on the visibility distance.

19. The apparatus of claim 18, wherein the processor is configured to extract the plurality of first end points and the plurality of second end points by determining a driving lane region from the first mad region and the second road region and extracting, as the plurality of first end points and the plurality of second end points, an end points of the driving lane region.

20. The apparatus of claim 18, wherein the processor is configured to extract the plurality of first end points and the plurality of second end points by extracting, as the plurality of first end points and the plurality of second end points, pixels at farthest distances from a side of the vehicle in the first image and the second image, among pixels included in the first road region and the second road region.

* * * * *